Oct. 3, 1933.  H. D. CHURCH  1,928,782
TRANSMISSION
Filed June 12, 1931  8 Sheets-Sheet 1

Fig.1

INVENTOR
HAROLD D. CHURCH.
BY
ATTORNEY

Oct. 3, 1933.     H. D. CHURCH     1,928,782
TRANSMISSION
Filed June 12, 1931     8 Sheets-Sheet 2

INVENTOR
HAROLD D. CHURCH.
ATTORNEY

Oct. 3, 1933.    H. D. CHURCH    1,928,782
TRANSMISSION
Filed June 12, 1931    8 Sheets-Sheet 3

INVENTOR
HAROLD D. CHURCH.
ATTORNEY

Fig. 4

Oct. 3, 1933.    H. D. CHURCH    1,928,782
TRANSMISSION
Filed June 12, 1931    8 Sheets-Sheet 5

INVENTOR
HAROLD D. CHURCH.
ATTORNEY

Oct. 3, 1933.      H. D. CHURCH      1,928,782
TRANSMISSION
Filed June 12, 1931      8 Sheets-Sheet 6

*First Speed*

Fig. 9

*Second Speed*

Fig. 10

INVENTOR
HAROLD D. CHURCH.
ATTORNEY

Oct. 3, 1933.  H. D. CHURCH  1,928,782
TRANSMISSION
Filed June 12, 1931  8 Sheets-Sheet 7

Third Speed

Fig.11

Fourth Speed

Fig.12

INVENTOR
HAROLD D. CHURCH
ATTORNEY

Oct. 3, 1933.  H. D. CHURCH  1,928,782
TRANSMISSION
Filed June 12, 1931   8 Sheets-Sheet 8

INVENTOR
HAROLD D. CHURCH.
ATTORNEY

Patented Oct. 3, 1933

1,928,782

UNITED STATES PATENT OFFICE 1,928,782

TRANSMISSION

Harold D. Church, Cleveland, Ohio, assignor to The White Motor Company, Cleveland, Ohio, a corporation of Ohio Application June 12, 1931. Serial No. 543,936

19 Claims. (Cl. 74—59)

This invention relates to transmissions for automotive vehicles, and more particularly to heavy duty, five-speed transmissions for busses and trucks, of the type disclosed in my copending application, Serial No. 419,438, filed January 8, 1930.

The principal object of this invention is to provide an improved operating mechanism for this type of transmission which will be simple and compact in construction and which may be operated to easily and positively select any of the various gear ratios with a minimum of frictional resistance.

Another object is to provide an improved arrangement for coupling the gear shift lever with the transmission which will permit the mounting of the transmission at a point remote from the lever.

Other objects are to provide cam means for moving the shifter rods in the transmission, and to arrange the cams on a rotatable and slidable shaft which may be shifted longitudinally to select a desired gear ratio and rotated to move the shifter rods.

Other objects relating to details of construction and economies of manufacture will appear hereinafter. In the accompanying drawings.

Referring to the drawings, the reference numeral 15 designates the casing which is generally of rectangular formation and which is provided with a cover plate 17 secured thereto by means of cap screws 18 to permit access to the interior of the casing. Projecting through the front wall of the casing is a driving shaft 19, supported in the casing by bearings 20, in a manner to be described hereinafter. Integrally formed on the inner or rear end of the shaft 19 is a gear 21 which is provided with an axial bore 22 providing a bearing for one end of a driven shaft 26. Splined on the shaft 19 and positioned between the two innermost bearings 20, is a gear 24, spaced from the innermost bearing by a thrust ring 25. Mounted on the forward end of the driving shaft 19 is a flanged driving element 27, inwardly of which are positioned sealing elements 28 to prevent egress of oil from the casing. All of these last mentioned elements which are mounted on the shaft 19 are secured in abutting relation by means of a nut 29 threaded on the end of the shaft.

The driven shaft 26 projects from the rear of the casing 10 and is supported at the rear end of the same by means of thrust bearings 30 and roller bearings 31. The forward end of this shaft is journalled in the bore 22 in the driving shaft 19 by means of roller bearings. To prevent egress of oil from the rear end of the casing, oil seal instrumentalities 32 are provided.

Mounted on the driven shaft 26 forwardly of the roller bearings 31 are a plurality of gears 33, 34, and 35 rotatably supported on the shaft 26 by roller bearings 36, 37 and 38 respectively. The shaft 26 is splined as at 39 between the gears 33 and 34 and slidably supported on this splined portion is a clutch 30 engageable selectively with either the gear 33 or the gear 34 to lock the selected gear to the driven shaft. The shaft 26 is also splined at 41, between the gear 35 and the gear 21 which is integrally formed on the driving shaft and slidably carried by this splined portion is a clutch 42 engageable selectively with the gear 21 or the gear 35. This clutch 42 is operable to lock the driving shaft 19 to the driven shaft 26 to establish a direct drive or to lock the gear 35 to the driven shaft. The bearings 37 and 38 are spaced apart by a spacing ring 43 and are held against lateral movement in one direction by means of a resilient thrust ring 44 fitted in a groove in the splines 41. The bearings are held against lateral movement in the other direction by the ends of the splines 39.

A flanged power take off element 45 is secured to the rear end of the driven shaft 26 and this element, togther with the other elements carried by the rear end of the shaft 26, are secured in position on the shaft against lateral movement by a nut 46 in much the same manner that the elements on the forward end of the driving shaft 19 are secured.

Figure 1:
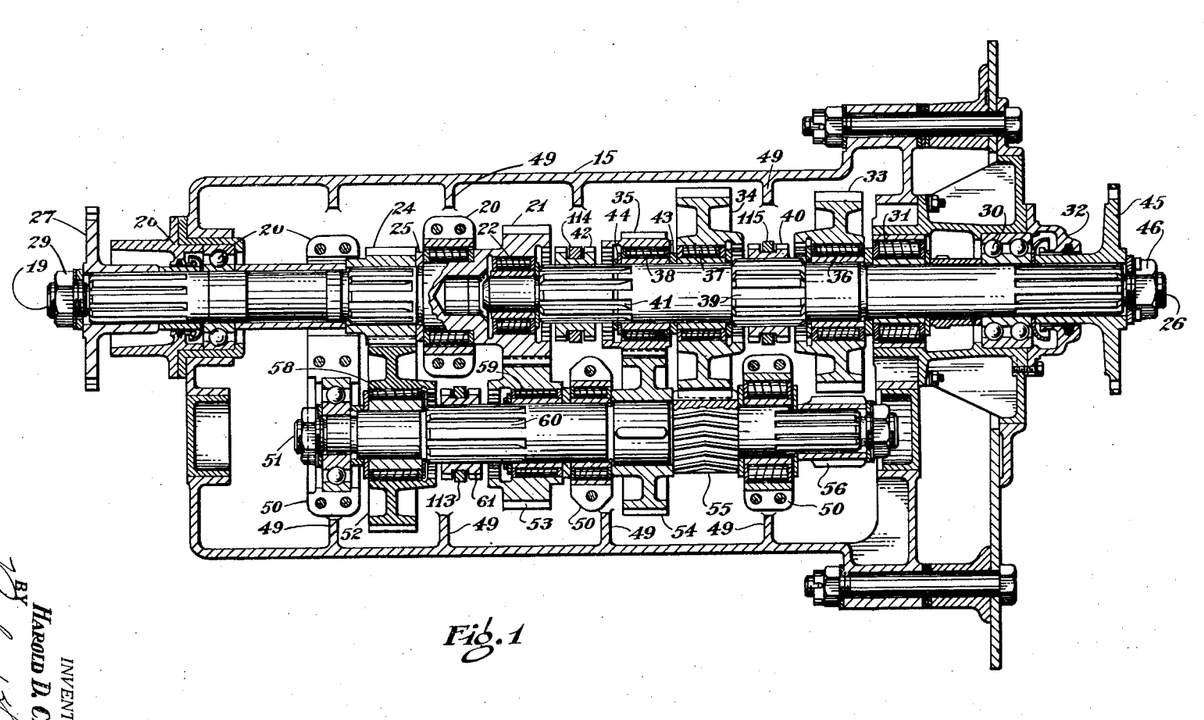
Figure 1 is a horizontal section taken transversely through the transmission casing showing the gears and shafting in elevation. In this view certain parts are broken away to more clearly reveal the nature of the invention.

The casing is provided with a plurality of transverse webs 49 which serve to support the bearings 20 for the drive shaft 19 and also bearings 50, of which there are three in number. A counter shaft 51 (see Figure 1) is journalled in the bearings 50 and carried by this countershaft are a plurality of gears 52, 53, 54, 55 and 56. The gears 52, 53, 54 and 55 are in constant mesh with the gears 24 and 21 on the drive shaft, and the gears 35 and 34 on the driven shaft, respectively. The gear 56 is keyed to the countershaft and is in constant mesh with an idler gear 57 journalled in one of the webs 49 and in one end of the casing 10. This idler gear 57 in turn is in constant mesh with the gear 33 on the driven shaft.

The gears 54 and 55 on the countershaft which mesh respectively with the gears 35 and 34, are keyed to the countershaft. The gears 52 and 53 are journalled on the countershaft by bearings 58 and 59 respectively. The countershaft 51 is splined at 60 between the gears 52 and 53 and slidably carried by the splined portion is a clutch 61. This clutch is operable to lock either of the gears 52 or 53 to the countershaft.

All of the gears above referred to are preferably provided with herringbone teeth in order to obtain silent running of the transmission and to prevent end thrust. The use of herringbone teeth is made possible by the fact that each pair of gears on the aligned driving and driven shafts and on the countershaft are in constant mesh and no shifting of the gears takes place in the operation of the transmission. It is within the purview of the invention however to employ spiral or spur gears if desired, and to shift the gears themselves rather than the clutches if this construction is preferred.

As will be pointed out in more detail later, seven possible gear ratio combinations are made possible by the above described arrangement of gearing, although only six such combinations are utilized by the gear ratio changing control mechanism which will presently be described.

The gears 24, 21, 52 and 53 are selected so that the countershaft may be driven at two different speeds by the drive shaft for each pair of meshing gears on the countershaft and the driven shaft. Towards this end the countershaft may be driven through the pair of gears 24, 52, by causing the clutch 61 to engage the gear 52 and lock this latter gear to the countershaft, or it may be driven through the pair of gears 21, 53, by causing the clutch 61 to engage the gear 53 and lock this gear to the countershaft.

First, or low, speed is attained by causing the driven shaft to be driven from the driving shaft through the gears 24 and 52, 55 and 34. To accomplish this, the clutches 61 and 40 are placed in engagement with the gears 52 and 34 respectively. Second speed is attained by causing the driving action to occur through the gears 21 and 53, 55 and 34, with the clutches 61 and 40 in engagement with the gears 53 and 34. Third speed is attained by causing the driving action to occur through the gears 24 and 52, 54 and 35, with the clutches 61 and 42 in engagement with the gears 52 and 35 respectively. Fourth speed is effected by direct driving with the drive shaft locked direct to the driven shaft and with the clutch 42 in engagement with the gear 21. During direct drive the countershaft 51 remains idle as the clutch 61 remains in neutral position. Fifth speed is attained by causing the drive to occur through the gears 21 and 53, 54 and 35. To accomplish this the clutches 61 and 42 are placed in engagement with the gears 53 and 35 respectively. Because of the specific nature of the gears employed, the countershaft will be driven by the driving shaft and the driven shaft will be driven by the countershaft at a higher rate of speed than the driving shaft. Reverse speed is effected by driving the countershaft through the gears 21 and 53 and by driving the driven shaft from the counter shaft in a reverse direction through the gear 56, the idler gear 57, and the gear 33 on the driven shaft.

Figure 6:
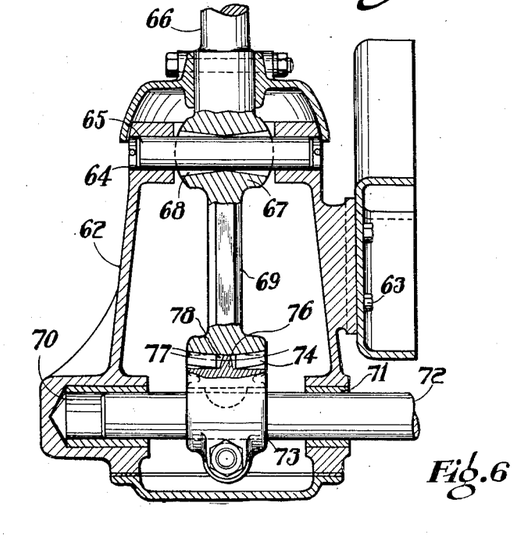
Figure 6 is a fragmentary sectional view taken on a vertical plane through the hand lever housing with certain parts being shown in full elevation.

Referring now to Figures 2, 4, 5, 6, 7 and 8 the specific means for controlling the gear ratios employed is shown. In Figure 6 the housing for the hand lever operating instrumentalities is shown at 62. This housing is in the form of a substantially cylindrical casing, bolted or otherwise secured as at 63, to the vehicle frame. The upper portion of the casing 62 is provided with a pair of aligned bores 64. A transverse shaft 65 extends across the upper part of the casing and has its ends secured in the bores 64. A hand lever 66 is provided at its lower end with an enlarged portion 67 having a bore 68 receiving the shaft 65. The bore 68 converges inwardly from both ends thereof to the center of the enlarged portion 67 to permit the lever to be rocked on an axis perpendicular to the shaft 65. Thus it will be seen that the hand lever 66 is universally mounted on the shaft 65 although universal movement of the shaft is, of course, limited by the angularity of the converging ends of the bore 68.

The lever 66 is provided with an extension 69 below the enlarged portion 67. The lower end of the casing 62 is provided with aligned bearings 70 and 71 in which a shaft 72, arranged to extend longitudinally of the vehicle, is slidably and rotatably journalled.

A split collar 73 is secured to the shaft 72 and is provided with gear teeth 74 arranged in an arc at the upper side of the shaft 72. An arcuate tongue 76 extends transversely of the gear teeth 74 at the centers thereof. The lower end of the extension 69 is formed with gear teeth 77 co-operating with the teeth 74 and a central groove 78 rceiving the arcuate tongue 76. As a result of this arrangement rocking of the lever 66 about the shaft 65, so that the upper end of the lever 66 moves transversely of the vehicle, causes corresponding rotation of the shaft 72 through the engaging gear teeth 77 and 74. Rocking of the lever 66 about an axis transverse to the shaft 65, so that the upper end of the lever moves longitudinally of the vehicle, causes sliding movement of the shaft 72 by reason of the engagement of the tongue 76 in the groove 78.

Figure 7:
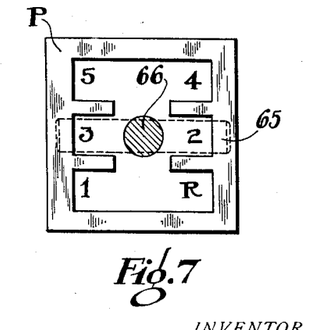
Figure 7 is a top plan view of the guide plate for the hand lever.

The lever 66 projects upwardly into the driving compartment of the vehicle through the guide plate P shown in Figure 7 which is secured to the floor. As seen in Figure 7, the lever 66 is in neutral position so that there is no driving connection through the transmission. The six recesses in the guide plate designated by the characters 1, 2, 3, 4, 5 and R correspond to the positions of the lever 66 in first to fifth speeds and reverse respectively. Thus when the upper end of the lever 66 is moved transversely of the vehicle to the left about the shaft 65, the lever moves into alignment with the two left hand recesses designated 1 and R. When the lever 66 is then pushed forwardly, it moves into the recess designated 1 and the shaft 72 is pushed rearwardly to effect engagement of the clutches which set the transmission in first or low speed. The other gear speeds are selected in the same manner and it will be evident that the shaft 72 is shifted rearward for first, third and fifth speeds and is shifted forwardly from its neutral position for reverse, second and fourth speeds.

Figure 8:
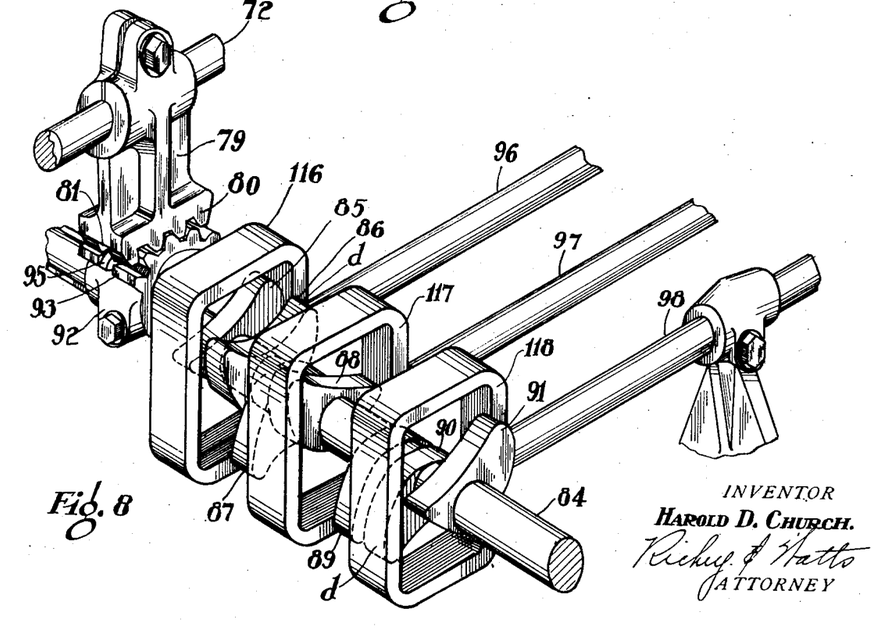
Figure 8 is a fragmentary perspective view of a portion of the shifting rod assembly employed in connection with the present invention.

In the embodiment shown, the transmission proper is disposed at a point on the vehicle rearward of the lever 66. The rear end of the shaft 72 is arranged to co-operate with a transverse cam shaft in the transmission casing which acts directly on the shifter rods. Figure 8 shows in perspective the rear end of the shaft 72 and the co-operating cam shaft and shifter rods, this view being taken from a point forward and to the left of the transmission casing. An arm 79 is secured to the shaft 72 in any suitable manner and carries at its lower end a series of rack teeth 80 extending transversely of the shaft 72. A groove 81 extends parallel with the shaft 72 through the centers of the teeth 80.

Slidably and rotatably journalled in bearings 82 and 83 (see Figure 4) formed in the sides of the casing 15 is a cam shaft 84 having a plurality of cams 85, 86, 87, 88, 89, 90 and 91 secured thereto. A split collar 92 is secured to the cam shaft 84 and carries an arcuate series of gear teeth 93 meshing with the rack teeth 80 carried by the shaft 72. An arcuate tongue 95 is arranged transversely of the teeth 93 and extends into the groove 81 in the member 79. By reason of this arrangement rocking of the shaft 72 produced by transverse swinging of the lever 66 causes sliding movement of the cam shaft 84 through the engagement of the tongue 95 in the groove 81. Similarly, sliding movement of the shaft 72 produced by forward or rearward movement of the lever 66 causes rocking of the cam shaft 84 through the interengaging teeth 80 and 93.

Figure 2:
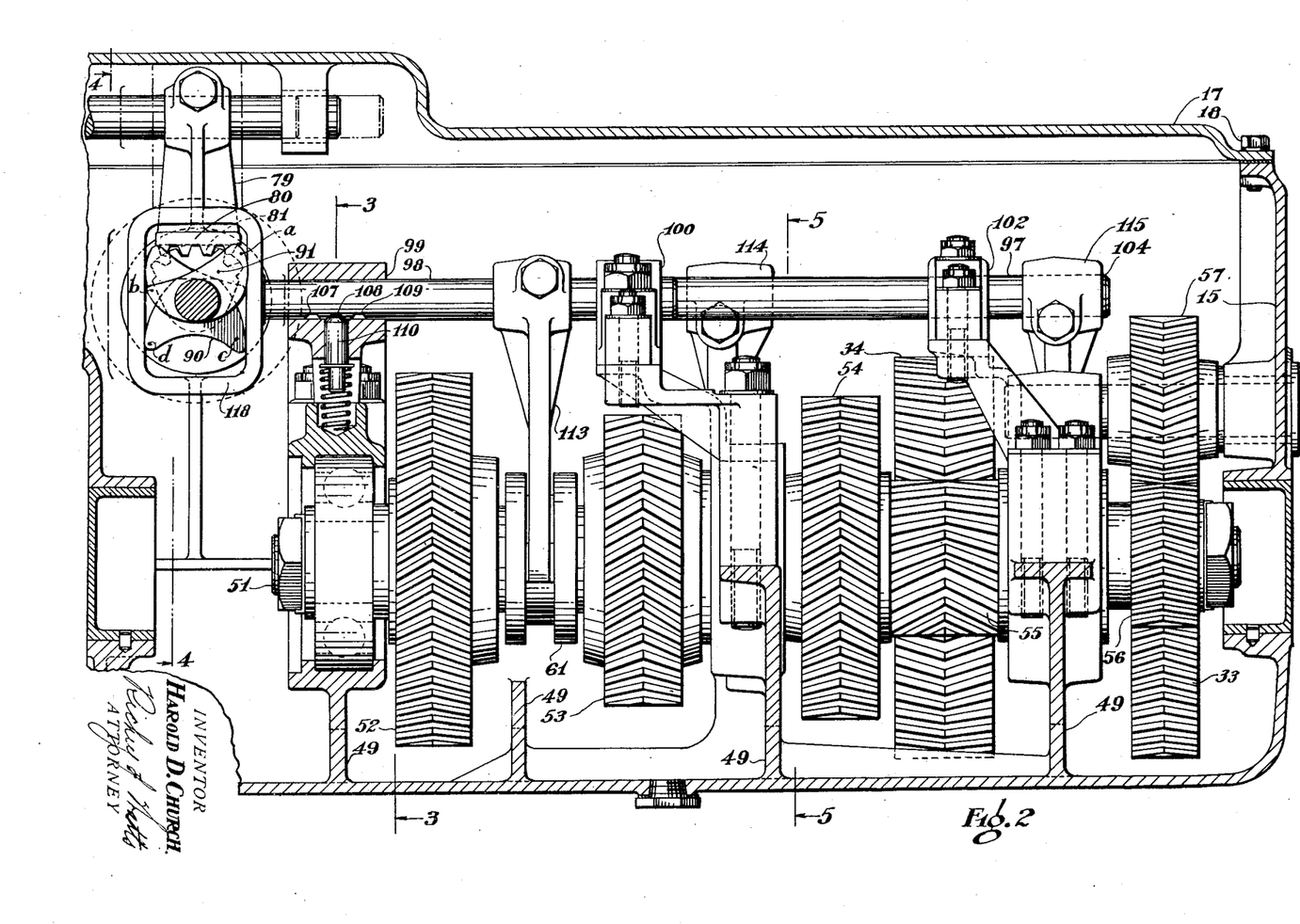
Figure 2 is a vertical section through the casing, the shafting, gears and bearings being shown in elevation.
Figure 3:
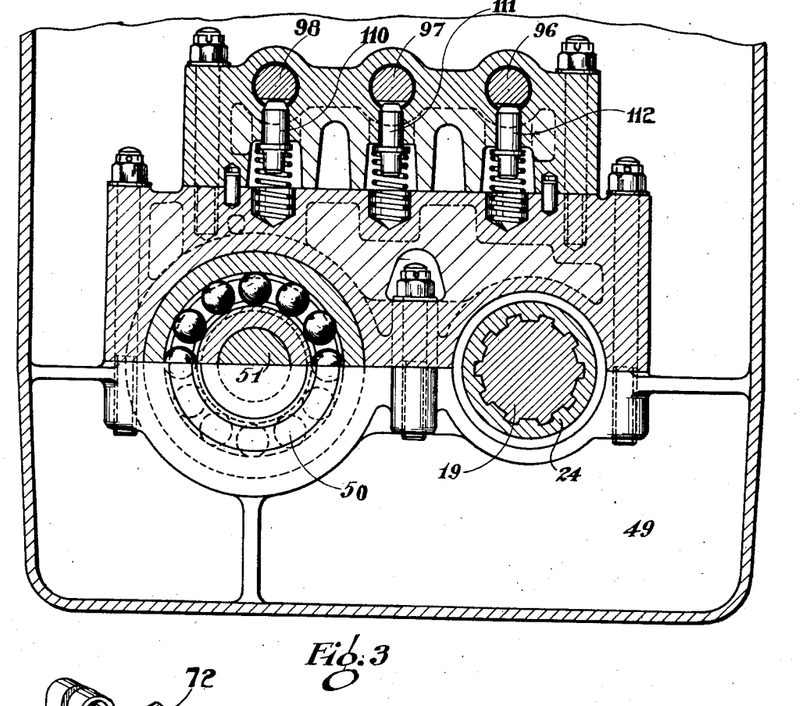
Figure 3 is a sectional view taken substantially along the line 3—3 of Figure 2.
Figure 4:
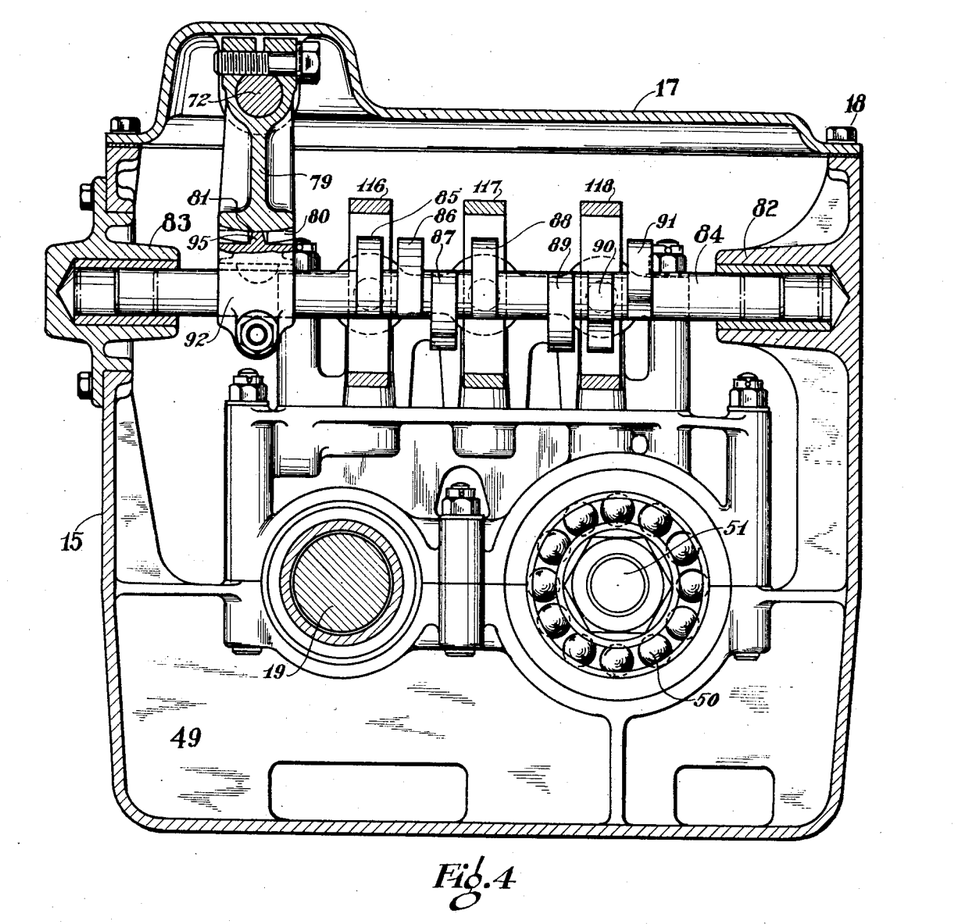
Figure 4 is a sectional view taken substantially along the line 4—4 of Figure 2.
Figure 5:
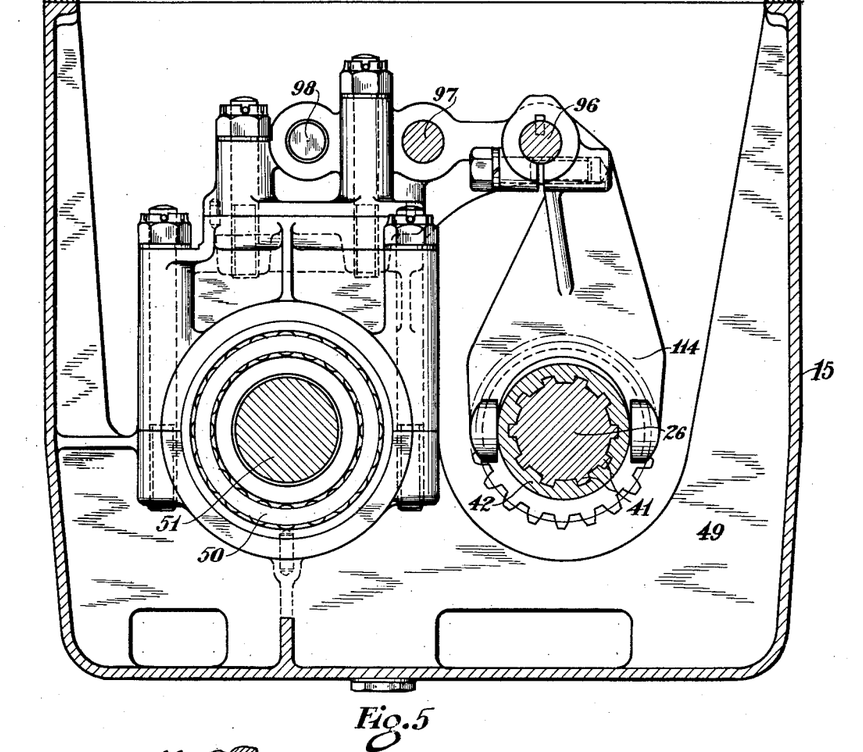
Figure 5 is a sectional view taken substantially along the line 5—5 of Figure 2.

Referring particularly to Figures 2 and 3 a plurality of shifter rods, 96, 97 and 98 are mounted in bearings at the opposite ends thereof carried by the webs 49 through the cap portions of the bearings 20 and 50 which support the drive shaft 19 and the countershaft 51 respectively. The rods 96, 97 and 98 are slidably mounted in their respective bearings and each rod is provided with a plurality of transverse grooves 107, 108 and 109. The grooves in the rods 98, 97 and 96 are arranged to selectively register with spring pressed plungers 110, 111, and 112, respectively, carried in a bearing block to resiliently retain each of the shifter rods in any one of its three positions.

The rod 98 carries a fork 113 the bifurcated end of which straddles the clutch 61. Similarly, the rod 96 carries a fork member 114 for operating the clutch 42 while the rod 97 carries a fork member 115 for operating the clutch 40. Movement of the rod 98 in one direction will cause engagement of the clutch 61 with the gear 52. Movement of the rod 98 in the opposite direction will cause engagement of this clutch with the gear 53. In a like manner movement of the rod 96 longitudinally in one direction or the other will cause engagement of the clutch 42 with either the gear 21 or 35 as the case may be. Movement of the rod 97 in either direction will cause engagement of the clutch 40 with either the gear 34 or 33.

In order to effect longitudinal movement of the desired shifter rods 96, 97 and 98 one end of each of these rods is provided with a substantially rectangular frame, which frames are designated 116, 117 and 118 respectively. These frames are substantially in alignment and the cam shaft 84 extends centrally through the same. The cam members 85, 86, 87, 88, 89, 90 and 91 are adapted to engage the sides of the frames 116, 117 and 118 upon rotation of this shaft in one direction or the other and by their camming action against these sides are adapted to slide the shifter rods, 96, 97 and 98 in one direction or the other to actuate the various clutches. Sliding movement of the shaft 84 permits selection of the proper cam members for co-operation with the proper frames while rocking movement of the shaft 84 actually effects operation of the selected clutch or clutches.

The seven cams 85 to 91 inclusive which are secured to the cam shaft 84 are of two types. The cams 85, 88 and 91 are identical in form and constitute the first type. Each of these cams 85, 88 and 91 is provided with a single arm $a$, having a cam surface thereon, and a relatively short point $b$. The cams 86, 87, 89 and 90 are identical in shape and constitute the second type, each of these cams being formed with two angularly disposed arms $c$ and $d$ having cam surfaces thereon. The cam shaft is shown in neutral position in perspective in Figure 8 and an end view thereof in neutral position is shown in Figure 2. It will be seen that the arms $a$ of the cams 85 and 91 extend upwardly on the rear side of the cam shaft 84 in neutral position, while the arm $a$ of the cam 88 extends upwardly on the forward side of the shaft 84 at a corresponding angle. The arms $c$ and $d$ of the cam 86 extend upwardly on opposite sides of the shaft 84 so that the arm $c$ substantially coincides with the arm $a$ of the cam 88 and the arm $d$ substantially coincides with the arms $a$ of the cams 85 and 91. The arms $c$ and $d$ of the cams 87, 89 and 90 extend downwardly on opposite sides of the shaft 84 at substantially equal angles and coincide with each other.

It will be evident from Figures 2 and 8 that when the shaft 85 is angularly in its neutral position all of the cams are arranged so that they will pass through the frames 116, 117 and 118 when the latter are in alignment. It will also be seen that when any of the cams 86, 87, 89 or 90 are in registration with any of the frames 116, 117 or 118 rocking movement of the cam shaft 84 in either direction causes corresponding sliding movement of the frames. Thus in the position shown in Figure 8 the cam 90 is in registration with the frame 118. When the hand lever 66 is pulled directly rearwardly from its neutral position causing the shaft 72 to slide forwardly, the cam shaft 84 is rocked in a counter-clockwise direction and the arm $d$ of the cam 90 engages the side of the frame 118 and moves the same forwardly, while the arm $c$ of this cam passes within the lower portion of the frame 118. On the other hand, if the lever 66 is moved forwardly from its neutral position the cam shaft 84 is rocked in a clockwise direction so that the arm $c$ of the cam 90 engages the frame 118 and pushes it rearwardly from its neutral position. It will also be noted that in both cases the cam and frame is returned to neutral position when the hand lever 66 is moved out of any particular recess in the guide plate P.

The cam 85 as seen in Figure 8 is in registration with the frame 116 in neutral position. When the shaft 84 is rocked in a clockwise direction the arm a of this cam engages the frame 116 and moves the same rearwardly. When the shaft 84 is rocked back to neutral position the point b of the cam 85 engages the opposite side of the frame 116 and returns the same to neutral position. However, when the shaft 84 is rocked in a counter-clockwise direction from the neutral position as seen in Figure 8 the arm a of the cam 85 moves upwardly within the frame 116 and does not engage or slide the same. The point b of this cam is of insufficient length to move the frame from its neutral position, although sufficiently long to return the frame to neutral position from its rearward position. It will be evident that a similar operation is produced by each of the other cams of corresponding shape.

By reference to Figure 7 it will be seen that the hand lever 66 has three operative positions laterally of the vehicle; one to the left in alignment with the recesses 1 and R, another to the center in alignment with the recesses 2 and 3, and a third on the right in alignment with the recesses 4 and 5. When the hand lever is moved into its left hand lateral position the shaft 72 is rocked to cause the cam shaft 84 to slide to the left. In this position the cam 89 comes into registration with the frame 118, the cam 87 registers with the frame 117, and none of the cams register with the frame 116. The cam shaft is shown in Figure 8 in its neutral position in which the lever 66 is in alignment with the recesses 2 and 3. In this position the cam 90 registers with the frame 118, the cam 88 registers with the frame 117 and the cam 85 registers with the frame 116. When the hand lever 66 is moved into its right hand position in alignment with the recesses 4 and 5 the cam shaft 84 is shifted to the right so that the cam 86 is in registration with the frame 116, none of the cams register with the frame 117 and the cam 91 registers with the frame 118.

Figure 9:
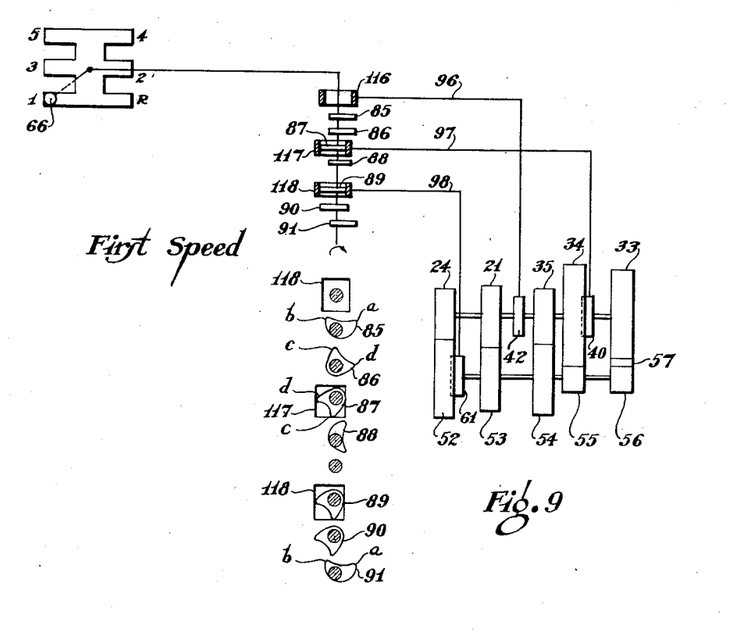
Figures 9, 10, 11, 12, 13 and 14 are diagrammatic views showing the arrangement of the cam operated shifting mechanism when the transmission is set for first, second, third, fourth, fifth and reverse speeds respectively.

The positions of the cams and frames in each of the several speeds is shown diagrammatically in Figures 9 to 14 inclusive. Each of these figures shows at the top an outline of the guide plate P, a top plan view of the cam shaft and frames, and an outline of the gears and shiftable clutches of the transmission proper. Directly below the top plan diagram of the cam shaft and frames in each figure is a series of 9 sectional views through the cam shaft illustrating the positions of the cams and frames. In Figure 9, the parts are shown in the positions which they occupy in first speed. It will be seen that the hand lever 66 is moved to the left and forwardly into the recess marked 1 to obtain this speed. The cam shaft 84 is shifted to the left so that the cam 87 registers with the frame 117 and the cam 89 registers with the frame 118, the frame 116 being idle. The movement of the hand lever 66 forwardly causes rocking of the cam shaft 84 in a clockwise direction so that the two frames 117 and 118 are moved forwardly, bringing the clutch 61 into engagement with the gear 52 and the clutch 40 into engagement with the gear 34. It will be seen that when the lever 66 is withdrawn from the recess 1 the cams 87 and 89 will be rocked in the opposite direction causing clutches 40 and 61 to return to their neutral position.

Figure 10:
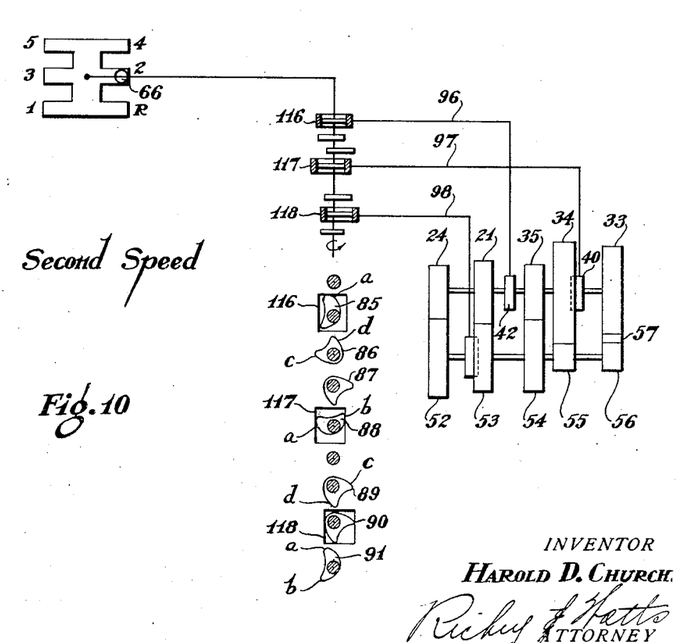

As seen in Figure 10 the hand lever 66 is then shifted to the right to its central position and moved rearwardly into the recess 2 to set the transmission in second speed. The shifting of the lever 66 to the right causes the cam shaft 84 to slide to the right bringing the cam 85 into engagement with the frame 116, the cam 88 into engagement with the frame 117 and the cam 90 into engagement with the frame 118. The moving of the lever 66 rearwardly into the recess 2 causes the cam shaft 84 to be rocked in a counter-clockwise direction so that the frame 117 is moved forwardly and the frame 118 is moved rearwardly, the frame 116 not being moved, since the cam 85 operates only when the shaft is rocked in a clockwise direction. This movement of the frames 117 and 118 moves the clutch 40 into engagement with the gear 34 and clutch 61 into engagement with the gear 53. When the lever 66 is then moved forwardly out of recess 2 the cam shaft is rocked in the opposite direction and the clutches are disengaged from the gears, the point b of the cam 88 returning the frame 117 to neutral position.

Figure 11:
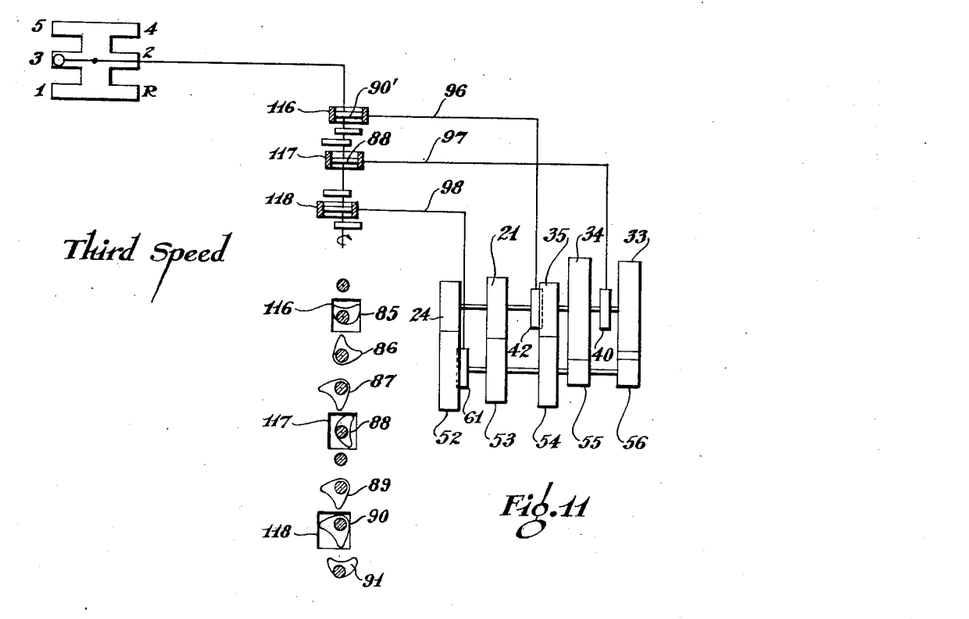

As seen in Figure 11 the hand lever 66 is then moved directly forward into the recess 3 to set the transmission in third speed. Since the hand lever is not moved laterally, the cam shaft 84 is not shifted and the same cams remain in engagement with the frames. The movement of the hand lever forwardly from its neutral position causes rocking of the cam shaft in a clockwise direction so that the cam 85 moves the frame 116 rearwardly engaging the clutch 42 with the gear 35 and the cam 90 moves the frame 118 forwardly engaging clutch 61 with the gear 52. The frame 117 is not moved since the cam 88 is effective only when the shaft is rocked in a counter-clockwise direction.

Figure 12:
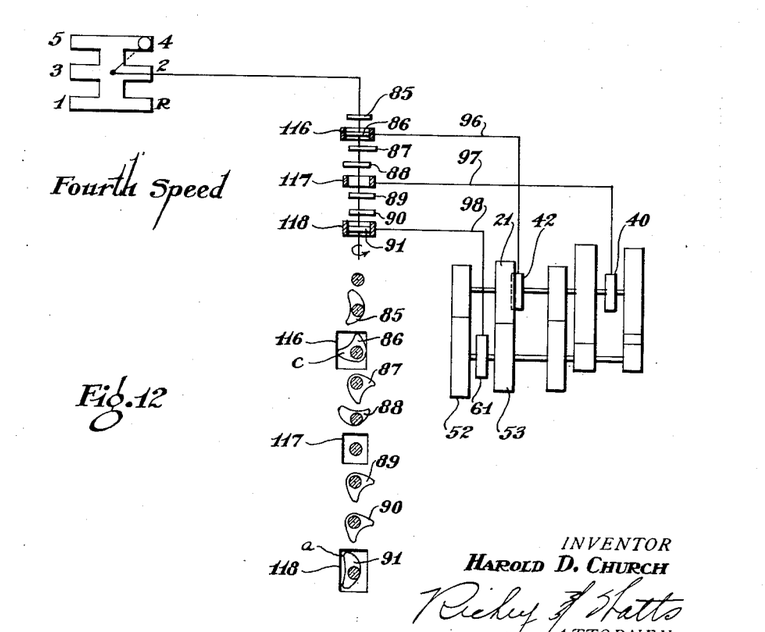

As shown in Figure 12 the hand lever 66 is then shifted into alignment with the recesses 4 and 5 and pulled rearwardly into the recess 4 to set the transmission in fourth or direct speed. The shifting of the hand lever to the right moves the cam shaft 84 to the right so that the cam 86 registers with the frame 116, and the cam 91 registers with the frame 118, none of the cams coming into registration with the frame 117. Pulling the hand lever rearwardly into the recess 4 rocks the cam shaft 84 in a counter-clockwise direction so that the arm c of the cam 86 moves the frame 116 forwardly causing the clutch 42 to engage with the internal clutch teeth in the gear 21 to couple the shafts 19 and 26. The arm a of the cam 91 moves upwardly within the frame 118 without shifting this frame so that the clutches 40 and 61 remain in their neutral positions. In this manner the countershaft is not driven by any of the gears, thereby reducing the frictional drag in the transmission during fourth or direct drive.

Figure 13:
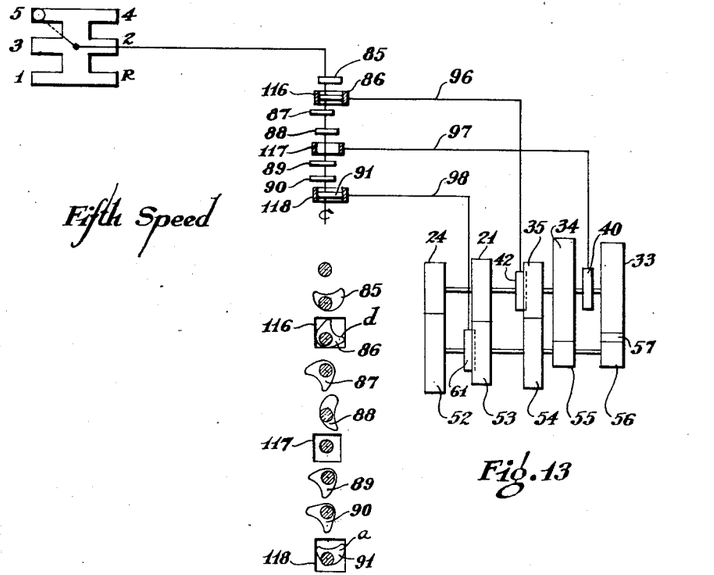

Fifth speed is obtained by moving the hand lever 66 directly forward into the recess 5 thereby leaving the same cams in registration with the frames as in fourth speed and rocking the cam shaft in a clockwise direction from its neutral position. The arm d of the cam 86 thereupon moves the frame 116 forwardly to engage the clutch 42 with the gear 35 and the arm a of the cam 91 moves the frame 118 forwardly to engage the clutch 61 with the gear 53. In this manner the countershaft is driven at the higher of its two speeds through the gear 53 and the driven shaft 26 is driven at a higher rate of speed than the drive shaft 19 through the gears 54 and 35.

Figure 14:
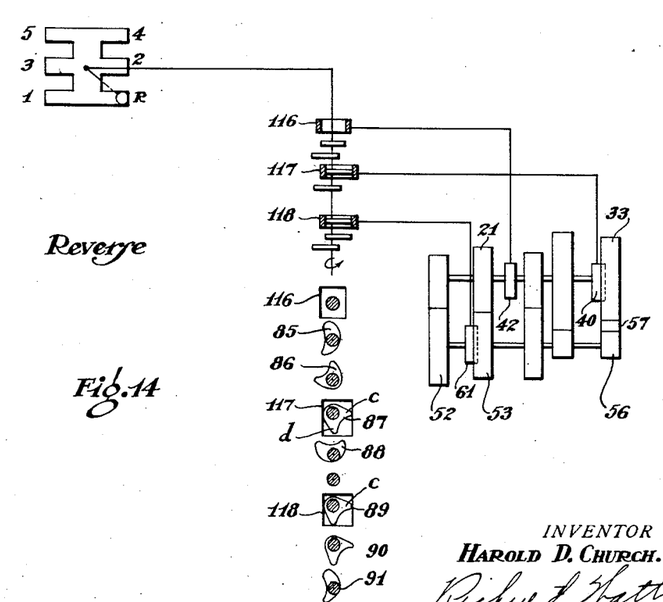

Reverse is obtained by moving the hand lever 66 to the left and rearwardly, or directly rearwardly from the first speed position. As shown in Figure 14 the cam 87 registers with the frame 117 and the cam 89 registers with the frame 118 when the hand lever is moved to the left. Rearward movement of the hand lever rocks the cam shaft 84 in a counter-clockwise direction so that the arm c of the cam 87 moves the frame 117 rearwardly to engage the clutch 40 with the gear 33 and arm c of the cam 89 moves the frame 118 rearwardly to engage the clutch 61 with the gear 53.

It will be evident that any desired arrangement of clutches or gears may be shifted simultaneously by the cam arrangement disclosed herein. For positions of the cam shaft in which it is desired to shift one of the clutches in one direction when the shaft is rocked in one direction and to leave the clutch in neutral position when the shaft is rocked in the other direction, it is only necessary to utilize a cam corresponding in shape to the cams 85, 88 and 91. For positions of the cam shaft in which it is desired to shift a clutch in one direction when the shaft is rocked in one direction and shift it in the opposite direction when the shaft is rocked in the other direction, it is only necessary to employ a cam corresponding in shape to the cams 86, 87, 89 and 90. Where it is desired to shift the clutch forwardly when the cam shaft is rocked in a counter-clockwise direction, the double cams are arranged with their arms c and d extending upwardly from the cam shaft in the manner in which the cam 86 is arranged. When it is desired to shift a clutch rearwardly when the cam shaft is rocked in a counter-clockwise direction the double cams are arranged with their arms c and d extending downwardly from the cam shaft in the manner in which the cams 87, 89 and 90 are arranged. It will be evident that the other type of cam corresponding to the cams 85, 88 and 91 can be arranged in any one of four positions to effect movement of the corresponding frame in either direction upon rocking of the cam shaft without moving the frame from its neutral position when the cam shaft is rocked in the opposite direction.

Although the shifting mechanism has been disclosed in combination with a preferred type of transmission and is shown as being arranged to shift dog clutches to lock the respective gears to the shaft it is to be understood that the gears could be shifted bodily in the usual manner by means of the cam arrangement disclosed. It will also be evident that regardless of the arrangement of gears in the transmission the cams may be arranged on the shaft in such a manner that the positions of the shift lever 66 in the guide plate P may be arranged in accordance with the standard gear shift positions so that successive speeds in shifting up from first speed to high speed are obtained by moving the hand lever alternately forwardly and rearwardly and shifting it one position at a time toward the right. It is to be understood that various re-arrangements of parts and modifications of structural elements may be resorted to without departing from the scope of the invention as defined in the following claims.

I claim:

1. In combination with a change speed transmission, a hand lever pivoted intermediate its length for limited universal movement, a slidable and rotatable shaft disposed adjacent and in engagement with one end of said lever, inter-engaging means on said lever and said shaft whereby rocking of said lever about one axis will effect rotation of said shaft, and other inter-engaging means on said lever and said shaft whereby rocking of said lever about an axis perpendicular to said first axis will cause sliding movement of said shaft.

2. In combination with a change speed transmission, a hand lever mounted for pivotal movement about two perpendicular axes, a slidable and rotatable shaft, inter-meshing gear teeth on said lever and said shaft whereby pivoting of said lever about one axis will cause rotation of said shaft, and inter-engaging means on said lever and said shaft whereby pivoting of said lever about its other axis will cause sliding movement of said shaft.

3. In combination with a change speed transmission, a hand lever mounted for pivotal movement about two perpendicular axes, a slidable and rotatable shaft, co-operating gear teeth on said lever and said shaft arranged to rotate said shaft when said lever is pivoted about one of its axes, and an inter-engaging tooth and groove on said lever and said shaft extending transversely of said gear teeth and arranged to slide said shaft when said lever is pivoted about the other of its axes.

4. In combination with a change speed transmission, a slidable and rotatable control shaft associated with said transmission, a slidable and rotatable connecting shaft arranged at an angle to said control shaft, a hand lever mounted for pivotal movement about two perpendicular axes, inter-engaging means on said hand lever and said connecting shaft whereby pivotal movement of said hand lever about perpendicular axes will cause respectively rotary movement and sliding movement of said connecting shaft, and inter-engaging means between said connecting shaft and said control shaft whereby one of such movements of said connecting shaft will impart rotation to said control shaft and the other of such movements of said connecting shaft will impart sliding movement to said control shaft.

5. In combination with a change speed transmission, a slidable and rotatable control shaft associated with said transmission, a slidable and rotatable connecting shaft arranged at an angle to said control shaft, a hand lever mounted for pivotal movement about perpendicular axes, inter-engaging means on said hand lever and connecting shaft whereby pivotal movement of said lever about its axes will cause sliding movement and rotation of said connecting shaft, and inter-engaging means on said connecting shaft and said control shaft whereby sliding movement of said connecting shaft will cause rotation of said control shaft and rotation of said connecting shaft will cause sliding movement of said control shaft.

6. In a change speed transmission having shifter rods to effect speed changes, a shaft carrying a cam, a cam follower mounted on a shifter rod and having wiper surfaces disposed on each side of said shaft, said cam having a relatively long arm arranged to engage one of said wiper surfaces and slide said shifter rod when said shaft is rocked in one direction and having a relatively short point arranged to engage the other of said wiper surfaces and to return said shifter rod to its initial position when the shaft is rocked in the opposite direction.

7. In a change speed transmission having shifter rods to effect speed changes, a shaft carrying a cam, a cam follower mounted on a shifter rod and having wiper surfaces disposed on each side of said shaft, said cam having a relatively long arm arranged to engage one of said wiper surfaces and slide said shifter rod when said shaft is rocked in one direction and having a relatively short point arranged to engage the other of said wiper surfaces and to return said shifter rod to its initial position when said shaft is returned to its initial position, said point being arranged to remain out of engagement with said wiper surfaces when said shaft is rocked past its initial position in the opposite direction.

8. In a change speed transmission having shifter rods, a rotatable shaft carrying a cam, a cam follower carried by a shifter rod and having wiper surfaces on each side of said shaft, said cam having a pair of angularly disposed arms arranged to engage said wiper surfaces, one of said arms engaging the wiper surface on one side of said shaft and acting to slide said shifter rod in one direction when said shaft is rocked in one direction, and the other of said arms engaging the wiper surface on the other side of the shaft and acting to slide said shifter rod in the opposite direction when the shaft is rocked in the opposite direction from its neutral position.

9. In a change speed transmission having shifter rods, a shaft having a cam thereon, a cam follower carried by a shifter rod and having wiper surfaces on each side of said shaft, said cam having a pair of angularly disposed arms extending upwardly from said shaft on opposite sides thereof and arranged to engage said wiper surfaces to slide said shifter rod when said shaft is rotated in either direction from its initial position.

10. In a change speed transmission having shifter rods, a shaft having a cam thereon, a cam follower carried by a shifter rod and having wiper surfaces on each side of said shaft, said cam having a pair of angularly disposed arms extending downwardly from said shaft on opposite sides thereof and arranged to engage said wiper surfaces to slide said shifter rod when said shaft is rotated in either direction from its initial position.

11. In a change speed transmission, a pair of slidable shifter rods, a shaft having a pair of spaced cams thereon, a cam follower carried by each of said shifter rods and having wiper surfaces disposed on each side of said shaft, one of said cams having a pair of relatively long angularly disposed arms arranged to engage the opposite wiper surfaces of one of said followers and slide the respective shifter rod when said shaft is rocked in either direction from its initial position, and the other of said cams having a relatively long arm arranged to engage one of the wiper surfaces on the other of said followers to slide the respective shifter rod when said shaft is rocked in one direction from its initial position and having a relatively short point arranged to engage the opposite wiper surface to move said shifter rod only to its initial position when said shaft is rocked in the opposite direction past its initial position.

12. In a change speed transmission, a pair of slidable shifter rods, a shaft having a pair of spaced cams thereon, each of said shifter rods carrying a cam follower having wiper surfaces disposed on opposite sides of said shaft, one of said cams having a pair of angularly disposed arms extending upwardly on opposite sides of said shaft and arranged to engage the wiper surface of one of said followers to slide said follower when said shaft is rocked in either direction from its initial position, and the other of said cams having a pair of angularly disposed arms extending downwardly on opposite sides of said shaft and arranged to engage the wiper surfaces of the other of said followers.

13. In a change speed transmission, a pair of slidable shifter rods, a shaft having a pair of spaced cams thereon, each of said shifter rods having cam followers with wiper surfaces disposed on opposite sides of said shaft, one of said cams being arranged to engage one of said followers to move the same in one direction from its initial position when the shaft is rocked in one direction and to return the follower only to its initial position when the shaft is rocked in the opposite direction and the other of said cams being arranged to engage the other of said followers and to return the same only to its initial position when said shaft is rocked in the first mentioned direction and to slide said follower from its initial position when the shaft is rocked in the second mentioned direction.

14. In a change speed transmission, a slidable and rotatable cam shaft having a pair of cams thereon, a slidable shifter rod having a cam follower provided with wiper surfaces on opposite sides of said cam shaft, said cams being arranged in their neutral position to pass between said wiper surfaces whereby said cam shaft may be shifted to bring either of said cams into registration with said follower and said cams being arranged to engage said wiper surfaces and slide said shifter rod when said cam shaft is rocked from its neutral position, and to return said shifter rod to neutral position when said cam shaft is rocked back to neutral.

15. In a change speed transmission a slidable and rotatable cam shaft having a plurality of cams thereon, a plurality of slidable shifter rods having cam followers thereon with wiper surfaces disposed on opposite sides of said shaft, said cams being arranged in their neutral positions to pass between said wiper surfaces only when said shifter rods are also in neutral position whereby said cam shaft may be shifted longitudinally to bring certain of said cams into registration with said followers, and arranged to engage said followers to slide certain of said shifter rods when said cam shaft is rocked from neutral position, and to return all of said shifter rods to neutral position when said cam shaft is returned to neutral position.

16. In a change speed transmission, a pair of shiftable elements, each of said elements having a neutral position and two operative positions, providing four different speeds including reverse, a shifter rod connected to each of said elements and carrying a cam follower having spaced wiper surfaces, a cam shaft having a plurality of cams thereon extending between said wiper surfaces, said cams being arranged in their neutral positions and in the neutral position of the shiftable elements to pass between said wiper surfaces whereby said cam shaft may be shifted longitudinally to bring various cams into registration with said followers, and said cams being arranged in such a manner that rocking movement of said cam shaft will slide one or the other of said shifter rods whereby any one of said four gear speeds may be selected.

17. In a transmission having a drive shaft, a countershaft and a driven shaft, a shiftable element arranged to couple said countershaft with said drive shaft to rotate the countershaft at one of two different speeds, a gear fixed to said counter-shaft in constant mesh with a gear loosely mounted on said driven shaft, a shiftable clutch arranged to couple said loose gear with said driven shaft or to directly couple said drive shaft with said driven shaft, a shifter rod connected to each of said shiftable elements and manually controlled means associated with said shifter rods and arranged to simultaneously shift said first mentioned shiftable element in either direction to couple said countershaft to said drive shaft and said second mentioned shiftable element in one direction to couple said countershaft with said driven shaft, said means being further arranged to retain said first mentioned shiftable element in neutral position and shift said second mentioned shiftable element in one direction to directly couple said drive shaft and said driven shaft.

18. In a change speed transmission including a countershaft, a drive shaft and a driven shaft, a shiftable element arranged to occupy a neutral position or to be shifted in either direction from its neutral position to couple said countershaft with said drive shaft at either one of two different speeds, a second shiftable element arranged to occupy a neutral position and to be shifted in one direction therefrom to couple said countershaft to said driven shaft and to be shifted in the other direction to directly couple said drive shaft and said driven shaft, a slidable and rotatable cam shaft having a plurality of cams thereon, shifter rods connected to said shiftable elements and carrying cam followers having wiper surfaces on opposite sides of said cam shaft, said cam shaft being arranged to be shifted longitudinally to bring certain cams into registration with said followers whereby rocking of said cam shaft in one direction causes both of said shiftable elements to be shifted into one of their operative positions and rocking of said cam shaft in the opposite direction causes said first mentioned shiftable element to remain in neutral position and the second shiftable element to be shifted into its opposite operative position, and said cam shaft being arranged to be shifted longitudinally to another position whereby rocking of the cam shaft in one direction will cause both of said shiftable elements to move into one of their operative positions.

19. In a transmission including a drive shaft, a countershaft and a driven shaft and shiftable elements arranged to drive said countershaft from said drive shaft at one of two different speeds and to drive said driven shaft from said countershaft at one of two different forward speeds and a reverse speed and to drive said driven shaft directly from said drive shaft, mechanism for simultaneously shifting said shiftable elements including a hand lever arranged to project upwardly, a guide plate having six recesses arranged to receive said hand lever, said recesses being arranged in two different vertical planes with three recesses in each plane, and means connecting said hand lever to said shiftable elements in such a manner that the movement of the hand lever into the recesses in the forward plane will set the transmission consecutively from left to right in first, third and fifth speeds, and movement of the hand lever into the recesses in the rearward plane will set the transmission consecutively from left to right in reverse, second and fourth speeds.

HAROLD D. CHURCH.